United States Patent
Gaillard-Groleas et al.

(10) Patent No.: US 11,815,346 B2
(45) Date of Patent: Nov. 14, 2023

(54) DEVICE FOR THE CHROMATIC CONFOCAL MEASUREMENT OF A LOCAL HEIGHT AND/OR ORIENTATION OF A SURFACE OF A SAMPLE AND CORRESPONDING METHODS FOR MEASURING A HEIGHT OR A ROUGHNESS OF A SAMPLE

(71) Applicant: SCIENCES ET TECHNIQUES INDUSTRIELLES DE LA LUMIERE, Aix-en-Provence (FR)

(72) Inventors: Jérôme Gaillard-Groleas, Aix en Provence (FR); Sébastien Gerand, Le Tholonet (FR); Gabrielle Moussu, Marseilles (FR)

(73) Assignee: SCIENCES ET TECHNIQUES INDUSTRIELLES DE LA LUMIERE

( * ) Notice: Subject to any disclaimer, the term of this patent is extended or adjusted under 35 U.S.C. 154(b) by 404 days.

(21) Appl. No.: 17/281,780

(22) PCT Filed: Oct. 2, 2019

(86) PCT No.: PCT/EP2019/076762
§ 371 (c)(1),
(2) Date: Mar. 31, 2021

(87) PCT Pub. No.: WO2020/070220
PCT Pub. Date: Apr. 9, 2020

(65) Prior Publication Data
US 2021/0381821 A1    Dec. 9, 2021

(30) Foreign Application Priority Data
Oct. 2, 2018  (FR) ...................... 1859112

(51) Int. Cl.
*G01B 11/06*    (2006.01)
*G01B 11/30*    (2006.01)

(52) U.S. Cl.
CPC ........ *G01B 11/0608* (2013.01); *G01B 11/303* (2013.01); *G01B 2210/50* (2013.01)

(58) Field of Classification Search
None
See application file for complete search history.

(56) References Cited

U.S. PATENT DOCUMENTS

| | | | |
|---|---|---|---|
| 2017/0227352 A1* | 8/2017 | Masuda | G01N 21/9501 356/244 |
| 2017/0276544 A1* | 9/2017 | Gastaldo | G01B 11/022 |
| 2018/0106595 A1* | 4/2018 | Christoph | G01B 11/007 |

FOREIGN PATENT DOCUMENTS

| | | |
|---|---|---|
| CN | 105842257 A | 8/2016 |
| CN | 107208996 A | 9/2017 |

(Continued)

OTHER PUBLICATIONS

International Search Report for PCT/EP2019/076762 dated Jan. 24, 2020. 3 pgs.

*Primary Examiner* — Michelle M Iacoletti
*Assistant Examiner* — Jarreas C Underwood
(74) *Attorney, Agent, or Firm* — Lerner David LLP

(57) ABSTRACT

The invention concerns a device (1) for the chromatic confocal measurement of a local height and/or orientation of a surface (S) of a sample comprising—a light source (2) configured to generate a polychromatic light beam (9)—a projection lens (4) comprising a lens (4) with axial chromatism configured to apply the light beam (9) to the surface (S) of the sample, —an optical sensor, configured to receive a light beam (9) reflected by the surface (S) of the sample and measure a total energy of the reflected light beam (9) received during an integration interval, —a scanning system (Continued)

(10), coupled to the projection lens (4) and configured to move the propagation axis of the light beam (9) relative to the projection lens (4), such that the total energy measured by the optical sensor corresponds to a dynamic spatial average of the total energy of the light beam (9) reflected by the surface (S) of the sample.

20 Claims, 4 Drawing Sheets

(56) References Cited

FOREIGN PATENT DOCUMENTS

| | | |
|---|---|---|
| DE | 102006026775 A1 | 12/2007 |
| EP | 1505425 A1 | 2/2005 |
| JP | 2017116492 A * | 6/2017 |

* cited by examiner

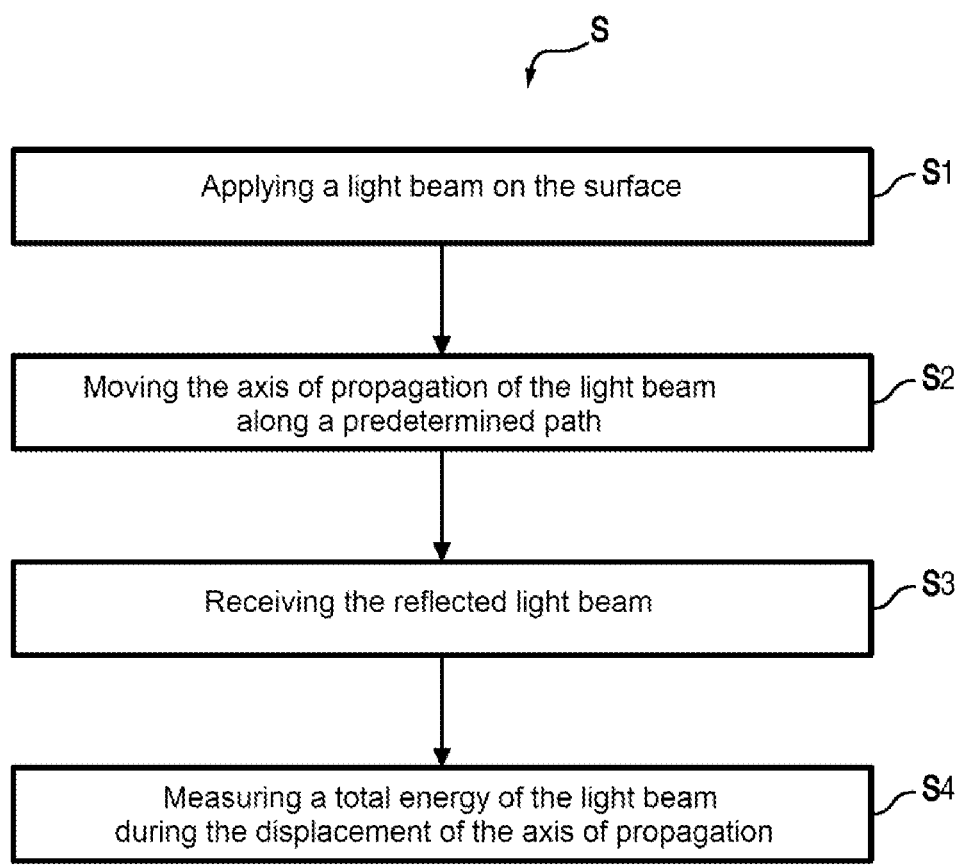

DEVICE FOR THE CHROMATIC CONFOCAL MEASUREMENT OF A LOCAL HEIGHT AND/OR ORIENTATION OF A SURFACE OF A SAMPLE AND CORRESPONDING METHODS FOR MEASURING A HEIGHT OR A ROUGHNESS OF A SAMPLE

CROSS-REFERENCE TO RELATED APPLICATIONS

The present application is a national phase entry under 35 U.S.C. § 371 of International Application No. PCT/EP2019/076762 filed Oct. 2, 2019, which claims priority from French Application No. FR 1859112 filed Oct. 2, 2018, all of which are incorporated herein by reference.

FIELD OF THE INVENTION

The invention generally concerns the field of the inspection and optical checking of a part and more specifically the measurement of a punctual orientation and/or height of a surface of a sample using an optical device.

TECHNOLOGICAL BACKGROUND

To date, there are measurement devices of the optical comparator type comprising an optical sensor that allows measuring the local orientation and/or height of a surface of a sample punctually and without contact. The diameter of the light beam at the surface of the sample (generally referred to as "spot") is generally comprised between 1.5 µm and 50 µm, depending on the chosen objective lens.

However, these optical comparators are sensitive to the roughness of the surface to be checked, which is likely to induce a significant lack of repeatability of the measurements. But these optical comparators are mainly used for checking parts whose roughness exceeds several micrometers, or a few tens of micrometers. However, being very sensitive to roughness, contact comparators of the mechanical probe type are often preferred insofar as they are more reliable and their measurements more robust, with submicrometer repeatabilities.

In order to improve the robustness of the measurements made by the optical comparators, and in particular their sensitivity to the roughness of the surface to be inspected or checked, it has been envisaged to expand the size of the measurement spot. However, when the optical comparator uses the chromatic confocal microscopy for making the measurements, the increase of the size of the measurement spot necessarily introduces optical aberrations that distort the measurements by amplifying the sensitivity of the comparator to roughness.

Document EP 1 505 425 describes a non-chromatic measurement device comprising a laser diode generating a monochromatic and coherent light beam. In order to suppress the speckle phenomena, this document proposes to add a mechanism that allows moving the light beam. However, since the light source of a chromatic confocal measurement device has a low coherence, these speckle phenomena are non-existent during the measurements. In addition, this document does not provide any teaching on the improvement of the sensitivity to the surface roughness of a chromatic confocal measurement device.

Document US 2017/0227352 for its part describes a chromatic confocal measurement device comprising means for moving the device to follow the object to be measured. On the other hand, this document does not propose any solution that allows improving the sensitivity of the device to the roughness of the surface to be measured.

SUMMARY OF THE INVENTION

An aim of the invention is therefore to propose a device for measuring a local orientation and/or height of a surface of a sample using the chromatic confocal microscopy whose sensitivity to the surface condition is improved by comparison with the current optical measurement devices, and which is capable of obtaining repeatabilities comparable to that of the mechanical probes so as to allow making robust and repeatable measurements, even when the surface of the sample to be checked has roughness on the order of a micrometer.

For that purpose, the invention proposes a chromatic confocal measurement device for measuring a local orientation and/or height of a surface of a sample, the device comprising:

a light source configured to generate a polychromatic light beam, a projection objective lens including an axial chromatism objective lens configured to apply the light beam on the surface of the sample, the light beam having a defined propagation axis, an optical sensor, configured to receive a light beam reflected from the surface of the sample and measure a total energy of said reflected light beam received during an integration interval, and a scanning system, coupled to the projection objective lens and configured to move the propagation axis of the light beam relative to the projection objective lens along a predetermined path during the interval of integration of the optical sensor, so that the total energy measured by the optical sensor corresponds to a dynamic spatial average of the total energy of the light beam reflected from the surface of the sample along the predetermined path.

Some preferred but non-limiting characteristics of the chromatic confocal measurement device described above are as follows, taken individually or in combination:

the light beam has a low coherence the projection objective lens further comprises a collimator and the scanning system is disposed between the collimator and the axial chromatism objective lens.

the scanning system is integrated into the axial chromatism objective lens.

the measurement device further comprises an optical fiber configured to connect the projection objective lens to the light source. In addition, the projection objective lens further comprises a collimator and the scanning system is disposed between the optical fiber and the collimator.

the scanning system is configured to move the propagation axis on the surface of the sample at a defined speed so that a distance traveled by the propagation axis on the surface of the sample during the integration interval measures between thirty micrometers and six hundred micrometers, preferably between fifty micrometers and four hundred micrometers.

the path is a closed loop.

the scanning system is configured to move the propagation axis along the path at a frequency greater than or equal to 1 Hz, preferably greater than 50 Hz.

the path has one of the following shapes: a line, a closed curve, a circle, a scan.

the scanning system comprises the at least one of the following elements: a controlled-decentration lens, a prism of which one input face is positioned so as to present a non-zero angle with respect to a plane normal to the propagation axis of the light beam at the level of its arrival on said input face, said prism being movably mounted in rotation about an axis which is normal to said plane, means configured to move at least one optical fiber connecting a light source to the projection objective lens so as to create a deviation from the propagation axis of the light beam by moving its source point, a plane mirror, movably mounted about an axis of rotation, a surface of the mirror forming a non-zero angle with respect to a plane normal to the axis of rotation, an orientable mirror adapted to introduce an optical deviation into the light beam.

the measurement device further comprises a spectral analysis system configured to determine a spectral distribution of the light beam reflected from the surface.

According to a second aspect, the invention proposes a chromatic confocal measurement method for measuring a height or a position of a surface of a sample using a device as described above, the method comprising the following steps:

generating a polychromatic light beam applying the light beam on the surface of the sample, the light beam having an propagation axis defined using the projection objective lens of the device, and receiving the light beam reflected from the surface by the optical sensor of the device and measuring a total energy of said reflected light beam received during an integration interval, moving the propagation axis of the light beam relative to the projection objective lens along a path predetermined during the reception of the light beam reflected from the surface by the optical sensor, so that the optical sensor makes a dynamic spatial average of the total energy of the light beam reflected from the surface of the sample along the predetermined path.

Some preferred but non-limiting characteristics of the measurement method described above are as follows, taken individually or in combination:

the method further comprises a step of defining the height or the position of the surface from the dynamic spatial average.

the reflected light beam is transmitted to a spectrograph configured to determine one or more peaks corresponding to interfaces encountered by the light beam on the surface, the method further comprising a step during which a sum of the thus determined peaks is made during the integration interval to obtain an averaged peak and a step during which a barycenter of the averaged peak is determined.

the propagation axis of the light beam is moved along a closed path.

the propagation axis of the light beam is moved along the path at a frequency greater than or equal to 1 Hz, preferably greater than 50 Hz.

a distance traveled by the propagation axis on the surface of the sample during the integration interval measures between thirty micrometers and six hundred micrometers, preferably between fifty micrometers and four hundred micrometers.

the path has one of the following shapes: a line, a closed curve, a circle, a scan.

the method further comprises a step of adjusting a speed of displacement of the propagation axis.

According to a third aspect, the invention proposes a method for determining a roughness of a surface of a sample using a chromatic confocal measurement device as described above, the method comprising the following steps:

generating a polychromatic light beam applying a light beam on the surface of the sample, the light beam having an propagation axis defined using the projection objective lens of the device, and receiving the light beam reflected from the surface by the optical sensor of the device and measuring a total energy of said reflected light beam received during an integration interval, moving the propagation axis of the light beam relative to the projection objective lens along a path predetermined during the reception of the light beam reflected from the surface by the optical sensor, so that the optical sensor measures a roughness of the surface of the sample along the predetermined path.

Some preferred but non-limiting characteristics of the roughness determination method described above are as follows, taken individually or in combination:

the propagation axis of the light beam is moved along the path at a frequency greater than or equal to 1 Hz.

a distance traveled by the propagation axis on the surface of the sample during the integration interval measures between one micrometer and twenty micrometers.

the method further comprises a step of identifying the local extrema of the total energy of the light beam along the predetermined path.

the reflected light beam is transmitted to a spectrograph configured to determine one or more peak(s) corresponding to interfaces encountered by the light beam on the surface, the method further comprising a step during which the extrema are determined by making a sum of the peaks during the integration interval to obtain an averaged peak and by determining limits of the averaged peak.

the reflected light beam is transmitted to a spectrograph configured to determine one or more peak(s) corresponding to interfaces encountered by the light beam on the surface, the method further comprising a step during which a sum of the thus determined peaks is made during the integration interval to obtain an averaged peak and a step during which a shape and/or a symmetry of the averaged peak is determined.

BRIEF DESCRIPTION OF THE DRAWINGS

Other characteristics, aims and advantages of the present invention will emerge more clearly upon reading the following detailed description, and with regard to the appended drawings given by way of non-limiting examples and in which:

FIG. 4 is a flowchart illustrating the steps of a method for measuring a local orientation and/or height or a roughness according to one embodiment of the invention.

DETAILED DESCRIPTION OF ONE EMBODIMENT

Figure 1:
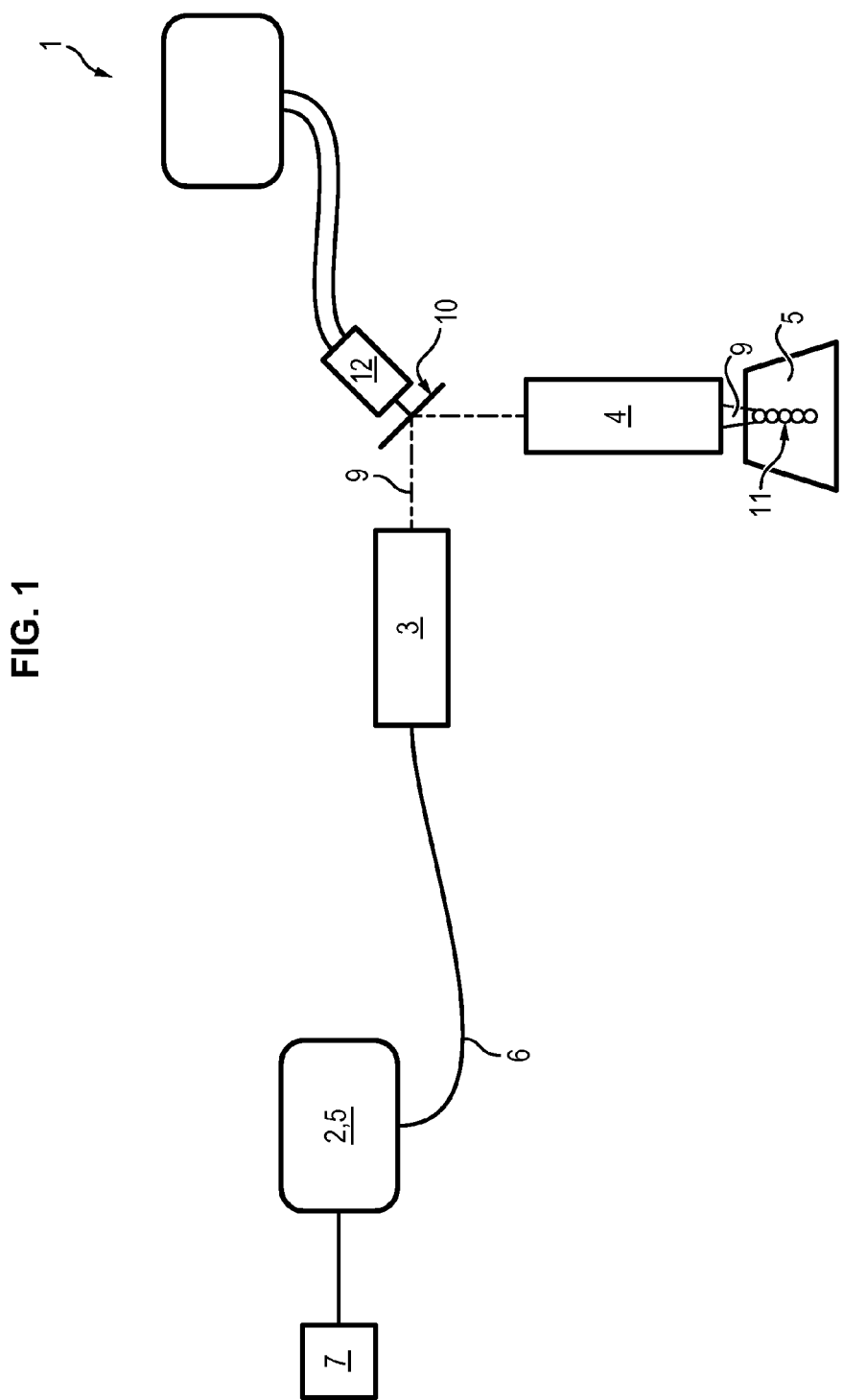
FIG. 1 is a schematic view of an exemplary embodiment of a device according to one embodiment of the invention comprising a "point sensor" and a reflection scanning system. Several examples of successive paths have been illustrated on the surface of the sample.

A device 1 for measuring a local orientation and/or height of a surface S of a sample, or comparator, comprises, in a manner known per se:

a light source 2, for example a white light-emitting diode or any other white light source, configured to generate a polychromatic light beam 9, a projection objective lens successively including a collimator 3 and an axial chromatism objective lens 4 (or light pen) configured to focus the light beam 9 generated on the surface S of the sample and receive the light beam 9 reflected from the surface S, a spectral analysis system 5 such as a spectrograph, configured to determine a spectral distribution of the light beam 9 reflected after its passage through the projection objective lens, signal processing means making it possible to analyze this spectral distribution in order to calculate the axial position of the surface S.

The light source 2, the projection objective lens and the spectrograph 5 can be connected by means of at least one optical fiber 6. In a manner known per se, the light source 2 and the spectrograph 5 can be housed in an optronic box, which can be connected to the projection objective lens by means of at least one optical fiber 6 and to the processing means by a cable. When appropriate, the projection objective lens 3, 4 can also be housed in the optronic box. It will be noted that, in this case, the optical fiber 6 is optional.

The light source 2 generates a polychromatic light beam 9, as opposed to a monochromatic light source such as a laser. The implementation of a polychromatic light beam indeed allows making chromatic confocal measurements and in particular presenting an axial chromatism along the measurement axis, which allows a distance measurement without any displacement of the measurement device.

Furthermore, the light beam has a low (spatial and temporal) coherence, as opposed to the laser beam which is spatially and temporally coherent.

The light pencil 4 has a known axial chromatism and comprises, in a manner known per se, a series of lenses disposed in the objective lens so that their optical axes are coaxial.

In a first embodiment illustrated in FIG. 1, the device 1 is a "point sensor". The light source 2 being polychromatic, the light pencil 4 forms a set of monochromatic images of the source (or, more specifically, of the end of the optical fiber 6 which acts like a pinhole). These images define an observation straight line segment in space, each image of the source being defined by its wavelength and its focusing distance relative to the light pencil 4. This same light pencil 4 further collects the backscattered light beam 9 to form, on the end of the optical fiber 6 which acts as a spatial filtering hole, a common polychromatic image of the set of the monochromatic images. This polychromatic image is composed of the wavelengths of the different interfaces encountered by the light beam 9 in the sample.

The polychromatic image is then transmitted, via the optical fiber 6, to the spectrograph 5. The spectrum which is measured therein then shows one or more peak(s) corresponding to the interfaces encountered by the light beam 9 when the sample is placed inside of the space covered by the chromatism (the observation straight line segment). For example, if the sample comprises an opaque surface S, there is a single wavelength of the light source 2 for which a clear image is obtained on the surface S. The signal processing means then allow deducing the distance between the light pencil 4 and the surface S from the wavelength identified by the spectrograph 5.

Figure 2:
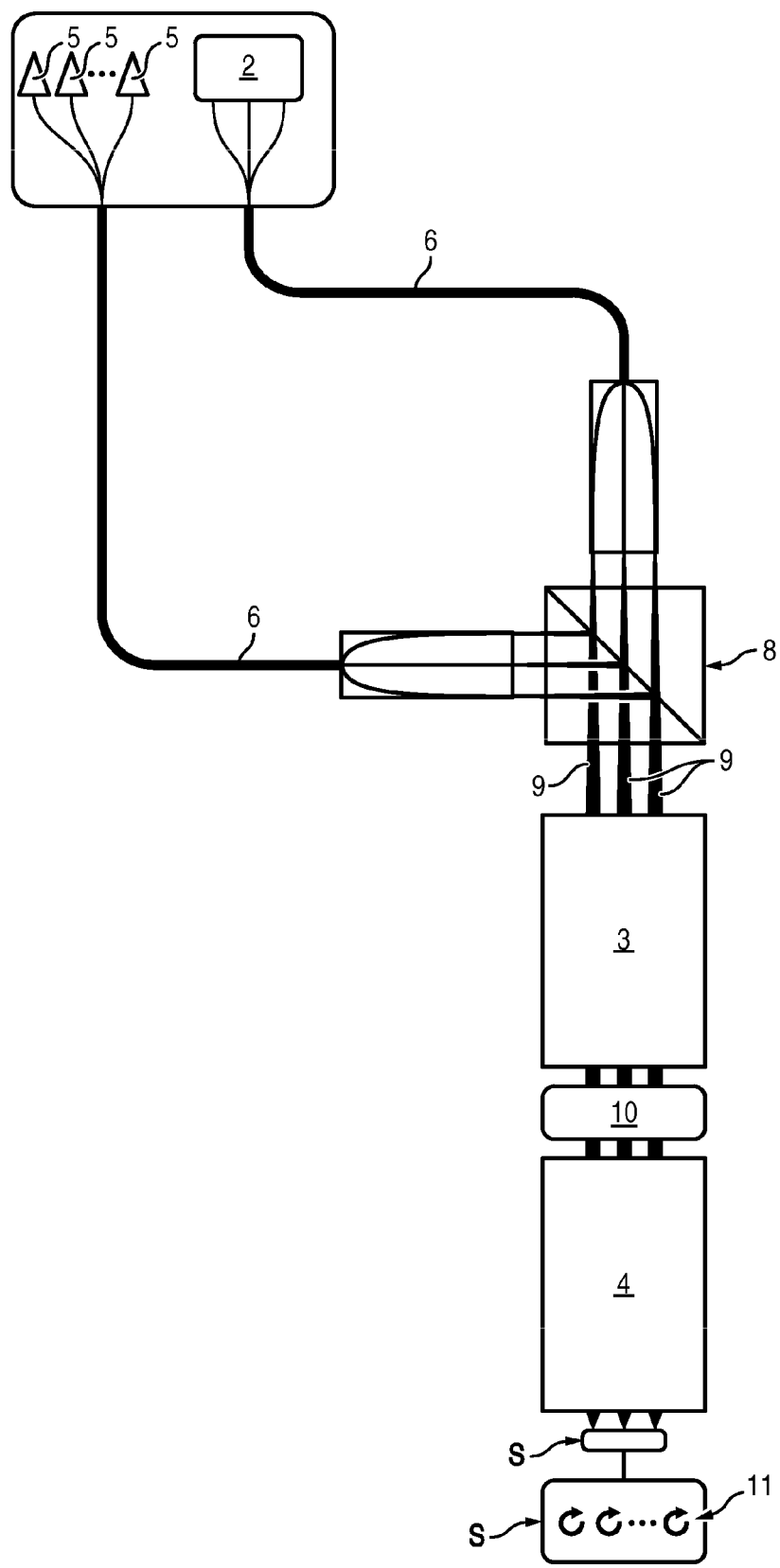
FIG. 2 is a schematic view of an exemplary embodiment of a device according to one embodiment of the invention comprising a "line sensor" and a transmission scanning system, as well as a top view of the surface of the sample on which several simultaneous paths have been illustrated.

In a second embodiment illustrated in FIG. 2, the device 1 is a "line sensor" and allows the simultaneous measurement of a set of points aligned along a line. Unlike the point sensor, the line sensor comprises a series of optical fibers 6 configured to guide the light generated by the light source 2 up to the input of the light pencil 4 and from the light pencil 4 back to the spectrograph 5. More specifically, the end of these optical fibers 6 are spatially organized so as to define a lateral measurement field (in particular a line). The light beams 9 emitted by each of these optical fibers 6 then propagate in the light pencil 4 via a splitter 8 up to the surface S, where they are dispersed along the optical axis. Analogously to the point sensor, each perfectly focused wavelength for each point of the lateral field is reflected from the surface S of the sample, propagates in the opposite direction in the light pencil 4 and is guided, via the splitter 8 and the optical fibers 6, up to the input of the spectrograph 5. The spectrograph 5 then comprises a photodetector in order to visualize the spectra corresponding to each measurement point of the line.

Figure 3:
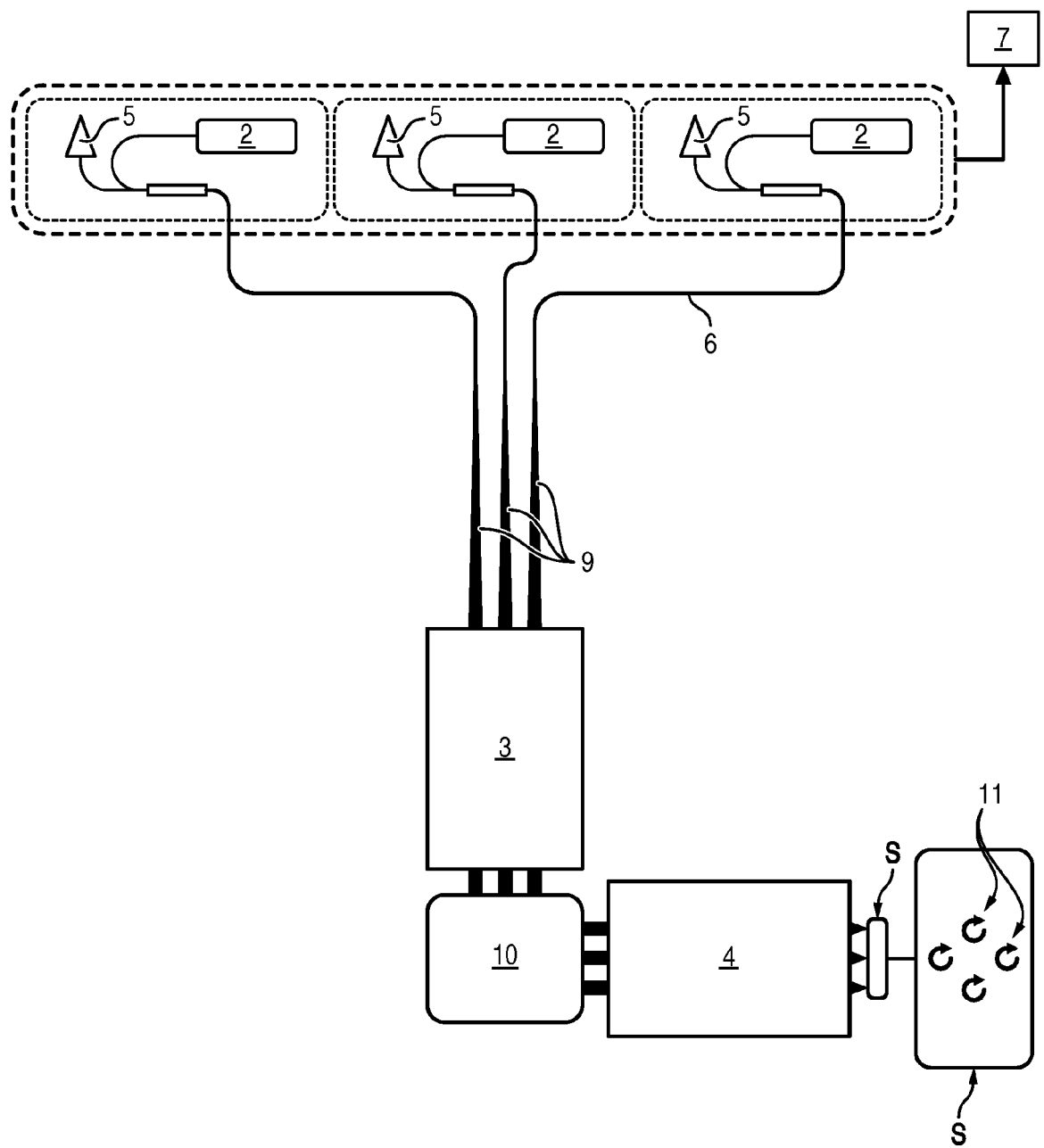
FIG. 3 is a schematic view of an exemplary embodiment of a device according to one embodiment of the invention comprising a "multipoint sensor" and a reflection scanning system, as well as a top view of the surface of the sample on which several examples of successive paths have been illustrated.

In a third embodiment illustrated in FIG. 3, the device 1 is a "multipoint sensor". It is a sensor in which several light sources are disposed in an orderly manner, but not necessarily aligned as in the case of a line sensor. It may be, for example, three points in a triangle, four points in a square or rectangle, N points distributed over a circle, and generally N points distributed according to a geometric pattern. These source points can be the end of an optical fiber each derived from a single point controller, as represented in FIG. 3, where the ends of the fiber beams similar to FIG. 2 in which the points are not necessarily aligned.

The signal processing means include an optical sensor 7 configured to measure a total energy (in J) of the light beam 9 reflected from the surface S of the sample through the projection objective lens during an integration interval (in s), as well as a processing unit, for example a computer or a server, adapted to execute the method which will be described in more detail below. The processing unit may for example comprise a processor, microprocessor, microcontroller, etc. type computer. The equipment also comprises control means (touch screen, keyboard, mouse, buttons, etc.).

In order to reduce the sensitivity of the device 1 to the roughness of the surface S to be checked or inspected, the device 1 further comprises a scanning system 10 coupled to the projection objective lens and configured to move the propagation axis of the light beam 9 relative to the optical axis of the projection objective lens along a predetermined path 11 during the interval of integration of the optical sensor 7. Thanks to the scanning system 10, the total energy measured by the optical sensor 7 corresponds to a dynamic spatial average of the total energy of the light beam 9 reflected from the surface S of the sample along the predetermined path 11. The device 1 therefore no longer makes a punctual measurement, during which the measurement point is fixed on the surface S during the integration interval, but an optically averaged spatial measurement resulting from the movement of the measurement point on the surface S during the interval of integration of the optical sensor 7, equivalent to the tip of a mechanical probe. The measurement of the device 1 is therefore made reliable, by enlarging the measurement surface S without however generating aberrations.

It will be noted that the optical sensor 7 only makes a single measurement of the total energy of the light beam 9 reflected from the measurement point during its displacement along the path 11 during the integration interval (optical average), and not a plurality of measurements which are then averaged (average of the individual measurements). The averaging is therefore made in real time, which allows using the sensor at its nominal rate while obtaining averaged measurements. In addition, no additional software processing is necessary to make this average since it is done optically, thus limiting the necessary computing power.

The dynamic spatial averaging made by the device 1 thus allows averaging the actual surface roughness S of the sample, regardless of the numerical aperture or the size of the measurement spot. Indeed, when the light pencil 4 has a low numerical aperture or a large measurement spot, the surface roughness S is necessarily amplified by the optical sensor 7: the addition of the scanning system 10 thus allows optically averaging not only the roughness of the surface S of the sample, but also the artefacts introduced by the light pencil 4 due to the combination of the roughness and the characteristics of the light pencil 4. It is therefore now possible to use light pens initially unsuitable for measuring a local orientation and/or height, but having other advantages such as a large working distance, a large measuring range or a high photometric efficiency, in order to make accuracy measurements by overcoming their theoretical limitations.

For that purpose, the signal obtained at the output of the optical sensor 7 by the signal processing means corresponds to the sum of all the peaks integrated during the interval of integration of the optical sensor 7. The obtained peak, or averaged peak, will therefore be widened according to the distribution of the different altitudes encountered during this integration interval, weighted by the reflectivity of the surfaces. The barycenter of the averaged peak corresponds to the average value of the altitudes—and therefore the desired height and/or orientation measurement.

When appropriate, the processing means can also be configured to determine the limits of the averaged peak, and more particularly its local extrema (roughness peaks and troughs), its symmetry or even its shape (rather of peak type or trough type), and to deduce therefrom information on the structure of the surface S and/or its texture. In one variant, the local extrema can for example be used to determine the roughness of the surface S. It is thus possible to determine standard parameters defined by the existing standards such as "Ra" (mean deviation) or "Rt" (total deviation) or symmetry parameters such as Rsk (height distribution asymmetry) or Rku (height distribution width). In another variant, the upper limit of the peak can be used to determine the position of the vertices rather than the average value of the reliefs, and thus provide a distance measurement close to the one provided by a mechanical probe which by nature is based on the vertices of the surface roughness.

Preferably in order to prevent the operator from perceiving the movement of the measurement spot and to avoid flickering due to the retinal resistance, the measurement rate of the optical sensor 7 is greater than or equal to 50 Hz. It is however noted that the measurements can be made at a lower rate without degrading them if necessary, for example on a very poorly reflecting surface requiring a greater integration time. In general, a frequency greater than 1 Hz can be used.

Generally, the sample to be inspected or checked is a mechanical part. Its roughness therefore results from its manufacturing method and can thus be oriented in a particular direction, for example its machining direction. In order to ensure that the scanning system 10 makes dynamic spatial averaging (optical averaging) of the reliefs of the surface S, it is therefore preferable that the path 11 is not a straight line parallel to this machining direction. As the machining direction is generally neither visible nor known by the operator carrying out the checking or inspection, the path 11 is therefore preferably omnidirectional. Examples of omnidirectional paths 11 comprise, without limitation, a closed curve of the circle, ellipse, oval, etc. type or a scan (that is to say a simultaneous or successive displacement of the measurement point along two perpendicular directions in the manner of a scanner). It will be noted that the choice of a path 11 of the closed and more particularly circular curve type allows obtaining a more homogeneous spatial averaging, whatever the type of roughness.

The distance traveled by the measurement spot along the path 11 during the interval of integration of the optical sensor 7 must be sufficient to obtain an effective spatial averaging and to smooth the roughness of the surface S and depends, in particular, on the roughness of the surface S. particularly, the greater the roughness of the surface S, the greater the speed of displacement of the propagation axis on the surface S must be in order to increase the distance traveled by the measurement spot on the surface S during the integration interval. That is why, in general, the distance traveled by the measurement spot during the integration interval is comprised between 30 μm and 600 μm, preferably between 50 μm and 400 μm. This distance thus allows obtaining results equivalent to the contact surface of a mechanical probe.

Preferably, during an interval of integration of the optical sensor 7, the measurement spot is applied only once on each area of the surface S disposed along the path 11. In other words, the measurement spot does not pass several times at the same place during the same interval of integration of the optical sensor 7. By way of example, in the case of a circular path 11, the measurement spot therefore travels at most the perimeter of the circle during the measuring interval. In the case where the measurement spot passes several times at the same place during the same integration interval, it is the distance traveled by the measurement spot along the path 11 during the non-overlapping integration interval that is decisive to make sure that the spatial averaging is sufficient. This non-overlapping distance is therefore preferably comprised between 30 μm and 600 μm, typically between 50 μm and 400 μm.

When appropriate, the speed of displacement of the propagation axis on the surface S can be programmed, when the scanning system 10 allows it. Optionally, when the speed of displacement of the propagation axis can be programmed, the device 1 can also be used in order to determine the roughness of the surface S. For that purpose, the speed of displacement of the propagation axis is chosen so that the distance traveled by the measurement spot during the integration time along the path 11 is small. The distance thus traveled depends on the roughness of the surface S to be measured: the rougher the surface S, the greater the distance traveled can be. In general, the distance traveled is preferably less than 30 μm, for example on the order of 1 μm to 20 μm. Indeed, by traveling such a distance, the optical sensor 7 does not make an optical average since, during the integration time, the total energy which is measured corresponds to a very short path 11. It is therefore the roughness of the surface S that is measured, and not its optical average that is made.

Alternatively or in addition, as indicated above, the roughness of the surface S can be determined by determining the local extrema using the processing means.

The scanning system 10 can comprise any means that allows moving the propagation axis so that the measurement spot travels a non-punctual path 11. For example, the scanning system 10 can operate in transmission and be inserted into the device 1 without bending (or deviating) the propagation axis. As a variant, the scanning system 10 can operate in reflection by creating at least one fold in the optical path of the light beam 9.

In a first embodiment, the scanning system 10 is integrated into the device 1, upstream of the light pencil 4. Preferably, the scanning system 10 is integrated between the collimator 3 and the light pencil 4.

Alternatively, the scanning system 10 could be fixed between the optical fiber 6 and the collimator 3 so as to move the source point or downstream of the light pencil 4.

For example, in a first embodiment, the scanning system 10 comprises a controlled-decentration lens, that is to say a lens associated with a mechanism configured to make it vibrate so as to decenter its optical axis, in the manner of a Speckle reducer or an optical stabilizer of a photographic camera. The vibrations generated by the mechanism then decenter the optical axis of the light beam 9 without bending it.

This embodiment allows obtaining a space-saving scanning system 10, allowing maintaining the initial path 11 of the optical axis without bending it.

Alternatively, other means for controlling the decentration of a lens can be used, typically liquid or liquid crystal lenses whose optical function (focal length, centering) can be modified by electrical commands.

In a second embodiment, the scanning system 10 comprises a prism of which one input face is positioned so as to present a non-zero angle with respect to a plane normal to the propagation axis of the light beam 9 at the level of its arrival on said input face. The prism is movably mounted in rotation about an axis which is normal to this plane and rotated by a dedicated motor 12.

For example, the prism can comprise a wedge prism placed on the optical path of the light beam 9, between the collimator 3 and the light pencil 4. The path 11 followed by the measurement spot on the surface S of the sample is then a circle whose radius is fixed and depends on the angle between its input face and the plane.

The angle between the input face of the prism and the plane can be equal to 0.5° in order to obtain a decentration of the propagation axis comprised between 25 µm and 30 µm. The path 11 is then a circle whose diameter is comprised between 50 µm and 60 µm.

The prism can be rotated by a motor 12. Preferably, the motor 12 is capable of rotating the prism at a frequency greater than 50 Hz, without generating vibrations, following a uniform rotational movement. For example, a hollow-shaft DC motor 12 can be used. Such a motor 12 can then be fixed in the projection device 1, with the prism, between the collimator 3 and the light pencil 4, and thus avoid offsetting the source of the movement of the prism. It is therefore not necessary to adapt the light pencil 4, and this scanning system 10 can be used in combination with any type of light pencil 4. Preferably, the device is balanced in order to reduce the vibrations which are likely to disturb the measurements. In the case where the device is not sufficiently balanced, the measurement rate is preferably chosen high so as not to excite the resonance frequencies of the device, to limit the vibrations and to reduce the noise that could be inconvenient for the operator.

In a third embodiment, the scanning system 10 comprises means configured to move the optical fiber(s) 6 which connect the light source 2 to the projection objective lens so as to create a deviation from the propagation axis of the beam by moving the source point.

In a fourth embodiment illustrated in FIG. 1, the scanning system 10 comprises a plane mirror, movably mounted about an axis of rotation so that a surface S of the mirror forms a non-zero angle with respect to a plane normal to this axis of rotation. It is therefore a reflection scanning system 10, by imposing an asymmetric movement that allows varying the position of the light beam 9 reflected by the scanning system 10 at the output of the light pencil 4. The path 11 and the speed of the measurement spot are defined by the movement applied by the mirror.

In this embodiment, the projection objective lens is therefore bent. Preferably, the scanning system 10 is placed between the collimator 3 and the light pencil 4, where the optical beam 9 is collimated.

For example, the mirror can be placed so that an angle between its axis of rotation and the propagation axis is equal to 45°, so that the collimator 3 and the pencil are placed at 90° relative to each other.

The angle between the surface S of the mirror and the axis of rotation is for example equal to 0.1°. The path 11 is then a circle whose diameter is on the order of 50 µm.

The mirror can for example be inclined relative to the plane normal to its axis of rotation by interposing a shim between the end of the shaft and the mirror. The difference in thickness of the shim (between its thinnest edge and its thickest edge) is then determined using the following formula:

$$e = \varnothing_{mirror} \times \sin\left(\left(\tan^{-1}\left(\frac{\varnothing_{path}}{2 \times \text{focal distance of the optical sensor}}\right)\right)\right)$$

where: e is the difference in thickness of the shim $\varnothing_{mirror}$ is the diameter of the mirror and of the shim $\varnothing_{path}$ is the diameter of the circle on which the measurement point moves on the surface S of the sample For example, for a path 11 with a diameter of 56 µm and a focal length of 10 mm, the difference in thickness of the shim is equal to 70 µm.

The mirror can be rotated about its axis of rotation by a motor 12. For example, a direct current motor 12, comprising a motor shaft 12 whose frequency is greater than or equal to 1 Hz can be used, for example on the order of 100 Hz. The mirror is fixed on the end of the motor shaft 12, its axis of rotation then being coaxial with that of the shaft.

For example, when the optical sensor 7 has an integration interval of 10 ms (i.e. an acquisition speed of 100 Hz), the speed of rotation of the motor 12 can be 6,000 rpm, which allows obtaining a averaging over one revolution for each time of integration of the sensor.

Advantageously, the use of a direct current motor 12 allows the modification of the speed of rotation of the mirror, and therefore the distance traveled by the measurement point during the interval of integration of the optical sensor 7. Its architecture further allows easily integrating it into device 1. Finally, its cost is moderate.

Alternatively, the mirror can be rotated by a stepper motor 12.

In a fifth embodiment, the scanning system 10 comprises an orientable mirror adapted to introduce an optical deviation into the light beam 9. Such a scanning system 10 can comprise several actuators, thus making it possible to combine their movements in order to obtain a two-dimensional path 11 forming any curve, which can be closed or open. The reactivity of such orientable mirrors is furthermore on the order of a millisecond, with very low noise.

The actuators can comprise at least one of the elements of the following group:

a magnetic coil fixed to a reference substrate associated with one or more magnets bonded on the inclinable surface (the mirror). The application of a current in the coil allows creating a magnetic field which attracts or repels the magnet(s) and thus angularly moves the optical surface S of the mirror.

a bimorph piezoelectric mechanism, comprising two piezoelectric plates fitted with electrodes, the application of a voltage to the electrodes expanding one of the plates and compressing the other.

a monomorphic piezoelectric mechanism, comprising a piezoelectric plate connected to an electrode and a reference substrate, a piezoelectric or electrostrictive stack comprising actuators composed of stacks of plates or discs that can be expanded or compressed by piezoelectric or electrostrictive effect depending on the used materials, a micro-electromechanical system (MEMS) comprising a continuous or segmented reflective membrane attached in certain points the actuators to an intermediate membrane which serves as upper electrode, while the lower electrode is etched in a silicon layer. A voltage applied across these two electrodes creates an electrostatic field which moves the membranes, and therefore the mirror.

For example, in the case of an orientable mirror comprising at least one piezoelectric-type actuator, it is possible to obtain a maximum frequency comprised between 1 kHz and 10 kHz depending on the selected technology and a mechanical stroke comprised between 5 µm and 40 µm.

In a second embodiment, the scanning system 10 is integrated into the light pencil 4.

For example, in one embodiment, one of the lenses of the light pencil 4 has a controlled decentration. The scanning system 10 then comprises a mechanism configured to vibrate one of the lenses of the light pencil 4 so as to decenter the propagation axis. The vibrations generated by the mechanism then decenter the propagation axis of the light beam 9 without bending it.

The invention claimed is:

1. A chromatic confocal measurement device comprising:
a light source configured to generate a polychromatic light beam;
a projection objective lens including an axial chromatism objective lens configured to apply the polychromatic light beam on a surface of a sample, the polychromatic light beam having a defined propagation axis;
an optical sensor configured to receive a reflected light beam, which is reflected from the surface of the sample, and to measure a total energy of the reflected light beam received during an integration interval; and
a scanning system coupled to the projection objective lens and configured to move the propagation axis of the light beam relative to the projection objective lens along a predetermined path during the integration interval of the optical sensor, so that the total energy measured by the optical sensor corresponds to a dynamic spatial average of the total energy of the reflected light beam along the predetermined path.

2. The chromatic confocal measurement device according to claim 1, wherein the polychromatic light beam has a low coherence.

3. The chromatic confocal measurement device of claim 1, wherein the projection objective lens further comprises a collimator and the scanning system is disposed between the collimator and the axial chromatism objective lens.

4. The chromatic confocal measurement device of claim 1, wherein the scanning system is integrated into the axial chromatism objective lens.

5. The chromatic confocal measurement device of claim 1 further comprising an optical fiber configured to connect the projection objective lens to the polychromatic light source, the projection objective lens further comprising a collimator and the scanning system being disposed between the optical fiber and the collimator.

6. The chromatic confocal measurement device of claim 1, wherein the scanning system is configured to move the propagation axis over the surface of the sample at a defined speed so that a distance traveled by the propagation axis over the surface of the sample during the integration interval is between thirty micrometers and six hundred micrometers.

7. The chromatic confocal measurement device of claim 1, wherein the scanning system is configured to move the propagation axis along the predetermined path at a frequency greater than or equal to 1 Hz.

8. The chromatic confocal measurement device of claim 1, wherein the scanning system comprises at least one of the following elements;
a controlled-decentration lens,
a prism having an input face positioned so as to present a non-zero angle with respect to a plane normal to the propagation axis of the polychromatic light beam at a level of an arrival of the polychromatic light beam on said input face, said prism being movably mounted in rotation about an axis which is normal to said plane,
means configured to move at least one optical fiber connecting the polychromatic light source to the projection objective lens so as to create a deviation of the propagation axis of the light beam by moving a source point of the polychromatic light source,
a plane mirror, movably mounted about an axis of rotation, a surface of the mirror forming a non-zero angle with respect to a plane normal to the axis of rotation, and
an orientable mirror adapted to introduce an optical deviation into the polychromatic light beam.

9. The chromatic confocal measurement device according of claim 1, further comprising a spectral analysis system configured to determine a spectral distribution of the reflected light beam.

10. A chromatic confocal measurement method comprising the following steps:
generating a polychromatic light beam;
applying the polychromatic light beam on a surface of a sample, the polychromatic light beam having a propagation axis defined using the projection objective lens of the device;
receiving the light beam reflected from the surface by an optical sensor and measuring a total energy of the reflected light beam received during an integration interval of the optical sensor; and moving the propagation axis of the polychromatic light beam relative to the projection objective lens along a predetermined path during the receiving step so that the optical sensor makes a dynamic spatial average of the total energy of the light beam reflected from the surface of the sample along the predetermined path.

11. The chromatic confocal measurement method of claim 10, further comprising a step of deducing a height or a position of the surface from the dynamic spatial average.

12. The chromatic confocal measurement method of claim 10, wherein the reflected light beam is transmitted to a spectrograph configured to determine peaks corresponding to interfaces encountered by the polychromatic light beam on the surface, the method further comprising a step during which the peaks are summed during the integration interval to obtain an averaged peak and a step during which a barycenter of the averaged peak is determined.

13. The chromatic confocal measurement method of claim 10, wherein the propagation axis of the polychromatic light beam is moved along the predetermined path at a frequency greater than or equal to 1 Hz and wherein a distance traveled by the propagation axis over the surface of the sample during the integration interval measures between thirty micrometers and six hundred micrometers.

14. The chromatic confocal measurement method of claim 10, wherein the predetermined path has one of the following shapes: a line, a closed curve, a circle, a scan.

15. The chromatic confocal measurement method of claim 10, further comprising a step of adjusting a speed of displacement of the propagation axis.

16. A method for determining a roughness of a surface of a sample comprising the following steps:

generating a polychromatic light beam;

applying the polychromatic light beam on the surface of the sample, the light beam having a propagation axis defined using a projection objective lens; and receiving the light beam reflected from the surface by an optical sensor and measuring a total energy of said reflected light beam received during an integration interval; and moving the propagation axis of the polychromatic light beam relative to the projection objective lens along a predetermined path during the receiving step so that the optical sensor measures a roughness of the surface of the sample along the predetermined path.

17. The method of claim 16, wherein the propagation axis of the light beam is moved along the predetermined path at a frequency greater than or equal to 1 Hz.

18. The method of claim 16, wherein a distance traveled by the propagation axis on the surface of the sample during the integration interval measures between one micrometer and twenty micrometers.

19. The method of claim 16, further comprising a step of identifying local extrema of the total energy of the polychromatic light beam along the predetermined path.

20. The method of claim 16, wherein the reflected light beam is transmitted to a spectrograph configured to determine peaks corresponding to interfaces encountered by the polychromatic light beam on the surface, the method further comprising a step during which the determined peaks are summed during the integration interval to obtain an averaged peak and a step during which at least one of a shape and a symmetry of the average peak is determined.

\* \* \* \* \*